(No Model.)
H. SCHMIDT.
NUT LOCK.
No. 594,432.
Patented Nov. 30, 1897.
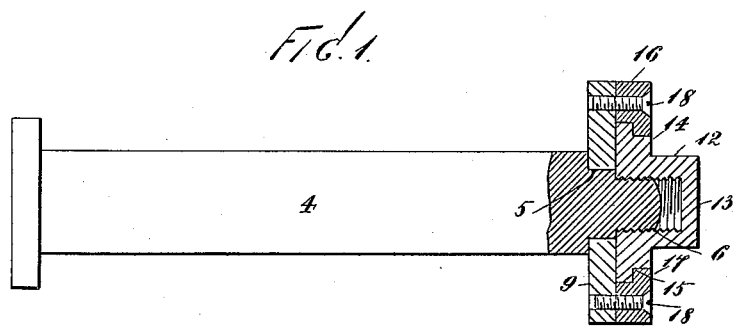
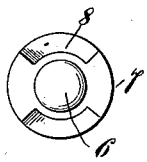
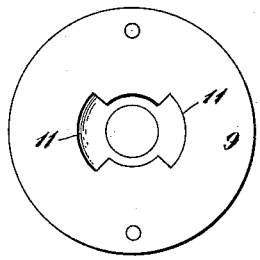
WITNESSES
INVENTOR
Hermann Schmidt,
BY
Edgar Tate & Co.
ATTORNEYS.

UNITED STATES PATENT OFFICE.

HERMANN SCHMIDT, OF BROOKLYN, NEW YORK.

NUT-LOCK.

SPECIFICATION forming part of Letters Patent No. 594,432, dated November 30, 1897.

Application filed July 30, 1896. Serial No. 601,026. (No model.)

*To all whom it may concern:*

Be it known that I, HERMANN SCHMIDT, a citizen of the United States, and a resident of Brooklyn, in the county of Kings and State of New York, have invented certain new and useful Improvements in Nut-Locks, of which the following is a specification, reference being had to the accompanying drawings, forming a part thereof, in which similar numerals of reference indicate corresponding parts wherever found throughout the several views.

The object of this invention is to provide an improved nut-lock which is simple in construction and operation; and the invention is fully disclosed in the following specification, of which the accompanying drawings form a part, in which—

Figure 1 represents a bolt provided with my improved nut-lock, the construction of which is shown in section; Fig. 2, an end view of the bolt with which the nut is connected, and Fig. 3 a side view of a washer which I employ and which forms a part of the nut-lock.

In the drawings forming a portion of this specification, 4 is a bolt, which may be of any desired size and material, the extremity of which is reduced at 6, resulting in the formation of a shoulder 7, and is screw-threaded, as shown. Beginning at the face of the shoulder 7 and running longitudinal of the shoulder are segmental cut-away portions 8, resulting in segmental opposite projections, as shown.

In Fig. 3 is shown a washer employed by me, which washer 9 has cut away from its center at 11 a portion the size and shape of and corresponding to the projections of the shoulder 7 and adapted to fit upon the bolt flush with the shoulder 7 and lying in the cut-away portions 8, so as to be incapable of turning upon the bolt, as shown in Fig. 1. I also provide a nut 12, the outer end of which is closed, as shown at 13, and said nut is provided at its inner end with an annular flange or rim 14, on which is formed another annular flange or rim 15, and I also provide a ring 16, having on its outer side an annular inwardly-directed flange 17, and said flange 17 is adapted to rest upon the annular flange or rim 15 on the nut 12, and said ring 16 is secured to the washer 9 by bolts or screws 18. When thus secured in place, it will be apparent that the nut 12 cannot come off, it being held securely in place by the ring 16, which is bolted to the washer 9.

The closing of the outer end of the nut 12, as shown at 13, is not absolutely necessary, though I prefer to employ this construction, and it will thus be seen that I provide a nut-lock which is simple in construction and operation, while being also comparatively inexpensive.

Having fully described my invention, I claim as new and desire to secure by Letters Patent—

The combination with a body having a narrowed screw-threaded extremity and a shoulder at the base of said narrowed portion, of segmental cut-away portions extending rearwardly from the shoulder resulting in similar projections adjacent the shoulder, a washer having a cut-away portion corresponding to the projections adjacent the shoulder and fitted upon the body flush with the shoulder, a flanged nut upon the screw-threaded extremity of the body, a ring encircling the nut and having a flange engaging the flange of the nut and the washer, and screws passed through the ring and into the washer as and for the purpose set forth.

In testimony that I claim the foregoing as my invention I have signed my name, in presence of the subscribing witnesses, this 28th day of July, 1896.

HERMANN SCHMIDT.

Witnesses:
W. W. HILL,
CHARLES S. ROGERS.